United States Patent
Taylor et al.

(10) Patent No.: US 7,910,663 B2
(45) Date of Patent: Mar. 22, 2011

(54) STABILIZED WATER-BORNE POLYMER COMPOSITIONS FOR USE AS WATER-BASED COATINGS

(75) Inventors: James W. Taylor, Gurnee, IL (US); Mark Van den Brink, Heerenveen (NL); Andre Van Meer, Noorwolde (NL)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/274,975

(22) Filed: Nov. 20, 2008

(65) Prior Publication Data

US 2009/0082493 A1    Mar. 26, 2009

Related U.S. Application Data

(62) Division of application No. 10/711,481, filed on Sep. 21, 2004, now Pat. No. 7,470,751.

(51) Int. Cl.
*C08F 8/42* (2006.01)
*C08K 5/09* (2006.01)
*C08K 5/098* (2006.01)
*C08K 5/053* (2006.01)

(52) U.S. Cl. ........... 525/370; 524/58; 524/284; 524/394

(58) Field of Classification Search ........... 524/58, 524/284, 394; 525/370; 523/160
See application file for complete search history.

(56) References Cited

U.S. PATENT DOCUMENTS

| | | | |
|---|---|---|---|
| 3,741,782 A | 6/1973 | Stewart et al. | |
| 4,312,797 A | 1/1982 | Aihara et al. | |
| 4,414,370 A | 11/1983 | Hamielec et al. | |
| 4,447,567 A | 5/1984 | Geerdes et al. | |
| 4,529,787 A | 7/1985 | Schmidt et al. | |
| 4,546,160 A | 10/1985 | Brand et al. | |
| 4,820,762 A | 4/1989 | Tsaur | |
| 4,839,413 A | 6/1989 | Kiehlbauch et al. | |
| 4,894,397 A | 1/1990 | Morgan et al. | |
| 5,422,394 A | 6/1995 | Taylor et al. | |
| 5,432,229 A | 7/1995 | Aoki et al. | |
| 5,472,485 A | 12/1995 | Pandian et al. | |
| 5,605,722 A | 2/1997 | Esser | |
| 5,661,208 A | 8/1997 | Estes | |
| 5,672,379 A * | 9/1997 | Schall et al. | 427/137 |
| 5,681,880 A | 10/1997 | Desor et al. | |
| 6,214,450 B1 | 4/2001 | Wickert et al. | |
| 6,333,370 B2 | 12/2001 | Lohs et al. | |
| 6,355,720 B1 | 3/2002 | Canard et al. | |
| 6,538,062 B2 | 3/2003 | Sakaguchi et al. | |
| 6,555,625 B1 | 4/2003 | Overbeek et al. | |
| 7,470,751 B2 * | 12/2008 | Taylor et al. | 525/370 |

OTHER PUBLICATIONS

Guyot et al., "Polymer Synthesis: Reactive Surfactants in Emulsion Polymerization," *Advances in Polymer Science*, vol. 111, pp. 43-65, (1994).
Gilbert, Robert G., "Colloid Science: Emulsion Polymerization, A Mechanistic Approach," Academic Press, Chapter 1, pp. 1-23, (1995).
Search Report for Taiwan Patent Application No. 094132363 dated Jan. 13, 2009.

* cited by examiner

*Primary Examiner* — Tae H Yoon
(74) *Attorney, Agent, or Firm* — Foley & Lardner LLP

(57) ABSTRACT

Stable water-borne polymer compositions are disclosed. The compositions comprise a water-borne polymer, a metal cross-linking agent and a stabilizing agent comprising from 2 to 10 carbon atoms and at least two functional groups independently selected from hydroxy and carboxy. The stabilizing agent is present a 1.4 mole percent or more of the amount of metal cross-linking agent. Inventive compositions are particularly suitable for use in water-based inks and coatings. Methods of making and using the coating compositions are also described.

22 Claims, No Drawings

STABILIZED WATER-BORNE POLYMER COMPOSITIONS FOR USE AS WATER-BASED COATINGS

CROSS-REFERENCE TO RELATED APPLICATIONS

This application is a divisional application of U.S. patent application Ser. No. 10/711,481, filed Sep. 21, 2004, now U.S. Pat. No. 7,470,751, the entire contents of which are incorporated herein by reference.

FIELD OF THE INVENTION

The invention relates to water based coatings and inks comprising stabilized water-borne polymer compositions. In particular, this invention relates to stabilized cross linkable water-borne polymers, suitable for use as binders in water-based inks for printing on plastic films and other substrates and as coatings such as overprint varnishes and paints.

BACKGROUND OF THE INVENTION

A variety of plastic films are used in the packaging industry for storage and shipping of goods. In many cases these plastic films are printed with text and images. Printing inks used for this purpose must meet certain end-use requirements for successful use in this application. These requirements include good printability, resolubility, and resistance properties. Inks used with plastic packaging must also exhibit good wetting and flow properties and fast drying times.

Due to environmental and health concerns from solvent based inks, increased emphasis has been placed on the use of water-based inks for printing on films used for packaging in recent years. Water-based inks with good printability, i.e., good ink transfer and wetting, good adhesion to substrate and good image resolution are therefore highly desirable. Similarly, water-based inks which have good resolubility, the ability of dry ink to re-disperse in the same ink when in a wet state, are also important. For example, if a press is stopped, as water-based inks begin to dry on the rollers they can undergo physical and chemical changes due to film formation, change in pH, and the like which render the printability of these inks problematic. Finally, resistance of the printed or coated film to mechanical forces, water, solvents and other chemicals is also highly desirable. However, many previous water-borne polymer coatings suffer from problems with adhesion, abrasion resistance, and water and solvent resistance.

Various polyvalent metal cross-linking agents have been used as additives to water-based coatings in an effort to improve the resistance properties of the coatings. In particular, zirconium-based cross-linking agents have been promoted as useful additives to water-borne polymer compositions, offering high solvent and abrasion resistance. The basis of the improved wet resistance properties is believed to be linkages formed by the metal species between the polymer molecules at carboxylate and hydroxyl groups. More specifically, it is believed that the carboxylate groups are directly bound to, e.g., the zirconium cations upon evaporation of water and other volatile constituents. The reaction is irreversible under normal coating conditions. In contrast, hydroxyl groups on the polymer likely hydrogen bond with hydroxyl groups attached to the zirconium ion. In either case, the exact nature of the metal cross-linking species (usually in the form of polymeric complexes) will depend on the amount of metal cross-linking agent present, the nature of the polymer, and the pH of the system, among other variables.

Despite their advantages, metal cross-linking agents such as zirconium agents suffer from chemical and colloidal stability problems. For example, ammonium zirconium carbonate (AZC) is susceptible to oxolation, a process in which the carbonate group is lost and an insoluble polymer gel of zirconium oxide is formed. This problem is exacerbated at dilute concentrations of AZC such as typically would be used with a water-borne polymer. In fact, a manufacturer of an aqueous solution of AZC (BACOTE 20, having 20% $ZrO_2$ solids) recommends that AZC be added as the last ingredient to a formulation and not be mixed with any other material or otherwise diluted prior to use. Furthermore, compositions containing water-borne polymers and metal cross linking agents such as zirconium lose their properties of resolubility and printability upon storage. Hence, the instability of zirconium agents such as AZC severely limits their use in water-based coatings.

There is a need for water-based coatings, especially inks, which have good wetting, drying speed, flow behavior, printability, resistance properties and resolubility when used for printing on plastic films and other substrates. Furthermore, such coatings must be stable upon storage and under normal conditions of use. Water-based inks and coatings of this invention exhibit these and other desirable properties when used on plastic films and other substrates.

SUMMARY OF THE INVENTION

In accordance with the present invention, there are provided water-based coatings comprising stabilized water-borne polymer compositions. Inventive compositions include a water-borne polymer, a metal cross-linking agent, and a stabilizing agent including from 2 to 10 carbon atoms and at least two functional groups independently selected from hydroxy and carboxy. The amount of stabilizing agent is 1.4 mole percent or more of the amount of cross-linking agent. Upon curing, the water-borne polymers become cross-linked by the metal cross-linking agent and exhibit superior wet resistance properties making them particularly suitable for use as binders in water-based inks for printing on plastic films and other substrates. At the same time, the stabilizing agent provides chemical and colloidal stability not previously obtained in such water-borne polymer compositions. The improved stability of inventive compositions permit their use in a wide variety of applications including water-based inks, overprint varnishes, paints, adhesives, sealing lacquers, molding materials, barrier coatings, electronic materials such as resists, and the like.

In another aspect, the present invention provides methods of making and using the water-borne polymer compositions described herein. Thus, for example, compositions may be prepared by combining the water-borne polymer with the metal cross-linking agent and the stabilizing agent. The water-borne polymer compositions of the invention may be applied as a film or coating to a substrate such as paper, wood, plastic, or textiles. The water-based compositions may be applied using curtain coating, flow coating or roll coating. When formulated as an ink, inventive compositions may be applied using gravure and flexographic printing processes including offset and screen printing processes.

DETAILED DESCRIPTION OF THE INVENTION

In one aspect, the present invention provides stabilized water-borne polymer compositions that include a water-borne polymer, a metal cross-linking agent, and a stabilizing agent comprising from 2 to 10 carbon atoms and at least two functional groups independently selected from hydroxy and carboxy. The amount of stabilizing agent is 1.4 mole percent or more of the amount of the cross-linking agent. In other embodiments, the amount of stabilizing agent can be 2.4 mole percent or more, 3 mole percent or more, or 7 mole percent or more of the amount of the cross-linking agent. The polymer compositions display superior wet resistance properties in inks and other coatings formulated with them, yet are stable at elevated temperatures, for long periods of time, or both. For example, inventive compositions can be stable for at least a month at 40° C. and up to six months at room temperature.

Water-borne polymers that can be used in inventive coating compositions typically include emulsion polymers and other types of water dispersible polymers. Suitable polymers include acrylics, vinyls (including but not limited to styrenics, polyvinyl alcohols, and polyvinyl acetates), acrylic/vinyls, polyurethanes, polyamides, polyesters, polyethylene glycols, styrene-butadiene-rubber (SBR) polymers, nitrocelluloses, hybrids thereof, or blends thereof. Hybrid polymers are compositions containing more than one type of polymer and are made by sequential polymerization of one polymer in the presence of another. Hybrid polymers can include copolymers wherein the preparation of the second polymer in the presence of the first polymer results in the formation of copolymer. Vinyl/acrylic emulsion polymers such as styrene/acrylic emulsion polymers are particularly suitable for use in inventive compositions. Natural polymers are also contemplated for use in the present invention and include proteins, (hydroxyethyl)cellulose, cotton, starch and the like. The dry weight of the polymers may be adjusted according to the application and can make up anywhere from about 0.1 to about 95 weight percent (wt %) of the composition. In other embodiments the weight of the water-borne polymer(s) constitute from about 0.1 to about 70 wt %, about 0.1 to about 60 wt %, about 1 to about 50 wt %, about 5 to about 50 wt %, or about 10 to about 40 wt % of the coating composition.

The preparation of water-borne polymers is well known to those skilled in the art. For example, the preparation of emulsion polymers is described in Emulsion Polymerization by Gilbert, R. G., Academic Press, N.Y., 1995, pp 1-23. Other water-borne polymers suitable for use in the practice of the present invention include styrene/acrylic polymers made by a continuous process. The preparation of these types of polymers is described in U.S. Pat. Nos. 4,546,160; 4,414,370; and 4,529,787. Yet other types of water-borne polymers suitable for use as described herein include resin-supported emulsions prepared by aqueous phase polymerization in the presence of water-dispersible support resins. These polymers are described in U.S. Pat. Nos. 4,894,397; 4,839,413; and 4,820,762. Additional water-borne polymers suitable for use in the practice of the present invention are water-borne autoxidizable polymers such as those described in U.S. Pat. No. 5,422,394; U.S. Pat. No. 6,333,370; U.S. Pat. No. 6,555,625; U.S. Pat. No. 4,312,797; and U.S. Pat. No. 4,447,567.

Generally such polymers are prepared with ethylenically unsaturated monomers, and initiators, and optionally with surfactants, alkali, and water or another reaction solvent. Exemplary monomers include but are not limited to acrylic acid, methacrylic acid, itaconic acid, maleic acid, fumaric acid, crotonic acid, acrylic anhydride, methacrylic anhydride, itaconic anhydride, maleic anhydride, fumaric anhydride, crotonic anhydride, styrene, methyl styrene, alpha-methyl styrene, ethyl styrene, isopropyl styrene, tertiary-butyl styrene, ethyl methacrylate, methyl methacrylate, butyl acrylate, butyl methacrylate, 2-ethylhexyl acrylate, ethyl acrylate, vinyl acetate, methyl acrylate, acyclic conjugated dienes, 2-hydroxyethyl methacrylate, 2-hydroxyethyl acrylate, methylol acrylamide, glycidyl acrylate, glycidyl methacrylate, vinyl esters, vinyl chloride, and the like. Water-borne polymers suitable for use with the present invention include self-cross linkable polymers (see, e.g., U.S. Pat. Nos. 5,432,229; 5,605,722; 6,355,720; and 6,538,062). Self-cross linkable polymers comprise polymerized self-cross linkable monomers such as diacetone acrylamide (DAAM), acetoacetoxyethyl methacrylate, acetoacetoxyethyl acrylate, allyl acetoacetate, vinyl acetoacetate, acrolein, formyl-styrol, vinyl methyl ketone, vinyl ethyl ketone, vinyl butyl ketone, diacetone acrylate, acetonyl acrylate, diacetone methacrylate, 2-hydroxypropyl acrylate acetylacetate, butanediol-1,4-acrylate acetylacetate, allyl methacrylate, and the like.

The skilled in the art will readily appreciate that the mixture of monomers may be varied as necessary to tailor the polymer to the particular application at hand. For example, water-borne polymers used in inventive compositions can have a wide range of acid numbers; e.g., 20-400. However, various other ranges are possible including 40-400, 60-400, 100-400, 20-350, 20-300, 20-250, 40-350, 40-300, and 60-300. Emulsion polymers having acid numbers in the 20-100 range are particularly useful. Other types of water-dispersible useful in this invention can have acid numbers in the range of 40-400. The water-borne polymers useful in the inventive compositions can also have a wide range of glass transition temperatures (Tg). For example polymers useful in this invention can have Tg values from −30 to 150° C. Also, the oxygen content of water-borne polymers useful in this invention can be in the range of from 10 to 30 percent by weight.

Metal cross-linking agents of the invention are polyvalent metals or metal complexes that cross-link individual polymer molecules to each other. The amount of metal cross-linking agents employed will vary depending upon the amount of water-borne polymer and the acid number of the polymer. Suitable polyvalent metals include zirconium, titanium, hafnium, chromium, zinc, aluminum, or a mixture of any two or more thereof. Zirconium is especially well suited as a metal cross-linking agent. The metal cross-linking agent is typically a salt or complex of ammonia, acetate, propionate, sulfate, carbonate, nitrate, phosphate, tartrate, acetylacetonate, oxide, or a mixture of any two or more thereof. Thus, exemplary metal cross-linking agents include ammonium zirconium carbonate, zirconium acetylacetonate, zirconium acetate, zirconium carbonate, zirconium sulfate, zirconium phosphate, potassium zirconium carbonate, zirconium sodium phosphate, zirconium tartrate, zinc oxide, and other combinations of the above polyvalent metals and counter ions. Similarly, organic titanates such as titanium acetylacetonate and titanium lactate chelate can be used.

The amount of the metal cross-linking agent used in inventive compositions will vary with the nature of the polymer and polyvalent metal. However, where the water-borne polymer comprises carboxylate groups, the composition has a molar ratio of carboxylate to metal cross-linking agent of from about 10:1 to about 1:2, from about 9:1 to about 1:2, from about 8:1 to about 1:2, from about 7:1 to about 1:2, from about 6:1 to about 1:2, from about 5:1 to about 1:2, from about 4:1 to about 1:2, from about 3:1 to about 1:2, from about 10:1 to about 1:1, from about 8:1 to about 1:1, from about 6:1 to about 1:1, from about 4:1 to about 1:1, or from about 3:1 to about 1:1.

A wide variety of organic compounds may serve as stabilizing agents so long as they contain at least two hydroxy or carboxy groups or one of each. It is to be understood that the stabilizing agents are not to be limited to two functional groups and may include additional hydroxy and carboxy groups as well as other functional groups such as oxo, amino, thiol, cyano, nitro, and the like if such groups do not interfere with the stabilizing ability of the compound. While such compounds may contain from 2 to 10 carbon atoms, typically compounds of the invention will have from 2 to 8 or 2 to 6 carbon atoms. Suitable stabilizing agents of the invention therefore include but are not limited to diols, hydroxy acids, diacids, sugars, or mixtures of two or more thereof. For example, a stabilizing agent can be tartaric acid, gluconic acid, mucic acid, saccharic acid, oxalic acid, glycolic acid, lactic acid, malic acid, citric acid, mandelic acid, malonic acid, maleic acid, succinic acid, a salt thereof, or a mixture of two or more thereof. Stabilizing agents which are sugars include mannitol, fructose, glucose, and mixtures of two or more thereof or mixtures with diols, hydroxy acids or diacids. The amount of stabilizing agent used in compositions of the invention is 1.4 mole percent or more, 2.4 mole percent or more, 3 mole percent or more, or 7 mole percent or more of the amount of cross-linking agent. Typically, the molar percentage of the stabilizing agent to metal cross-linking agent is at least 1.4, 2.4, 3, 7, 8, 9, or 10 mole percent to about fifty mole percent. Alternatively, the molar percentage of the stabilizing agent of metal cross-linking agent is at least 1.4, 2.4, 3, 7, 8, 9, or 10 to about 40 mole percent or at least 1.4, 2.4, 3, 7, 8, 9, or 10 to about 30 mole percent or is at least 1.4, 2.4, 3, 7, 8, 9, or 10 to about 20 mole percent.

Stabilized water-borne polymer compositions of the invention can also include a variety of additives including one or more surfactants (e.g. 0-2 wt %), solvents (0-25 wt % of, e.g., amines, alcohols, fast or slow solvents), leveling agents, rheology agents (0-5 wt %), waxes (0-7 wt %), buffering agents (0-2 wt % of, e.g., carbonates), dispersing agents, defoaming agents (e.g., 0-2 wt %), antifoaming agents (e.g., 0-2 wt %), modifying polymers, rewetting agents, biocides and others known to those of skill in the art.

A wide range of surfactants are suitable for use including anionic, cationic, and nonionic. Typically, anionic surfactants include alkyl sulfonates, alkylaryl sulfonates, alkyl sulfates, sulfates of hydroxyalkanols, alkyl and alkylaryl disulfonates, sulfonated fatty acids, sulfates and sulfonates of polyethoxylated alkanols and alkylphenols as well as esters of sulfosuccinic acid. Nonionic surfactants are particularly suitable for use with inventive compositions and include, e.g., alkylene oxides, polyvinylpyrrolidone, alkyl polysaccharides, and the like. In addition, polymerizable surfactants can be incorporated into the polymer compositions and include polyethoxylated alkyl phenyl ethers such as NOIGEN RN-4065 and sulfates thereof (e.g., HITENOL BC-2020). Other types of polymerizable surfactants can also be incorporated in the polymer compositions of the invention including those described by Guyot and Tauer in "Reactive Surfactants in Emulsion Polymerization", Adv. Poly. Sci., 1994, vol 111, pp 45-64; surfactants available under the trade name POLYG-LYKOL V 1100, 2000, and 5000; EMULSOGEN R 109,208 and 307; M-PEG 750 and GENAPOL LA 070 (Clariant GmbH).

Upon drying, coating compositions of the invention display excellent strength and hardness and are especially useful as top coating agents for plastics, overprint varnishes, printing inks, paints, adhesives, fillers, molding materials, electronic materials such as resists, or the like. Thus, an overprint varnish, a paint or a heat seal lacquer may each independently include a stabilized water-borne polymer composition as described herein. An ink may further include a pigment. In another aspect of the invention, there are provided methods of making coating compositions as described herein comprising combining the water-borne polymer, the metal cross-linking agent and the amount of cross-linking agent described herein.

Compositions are further provided which include a water-borne polymer; a metal cross-linking agent; and a stabilizing agent comprising from 2 to 10 carbon atoms and at least two functional groups independently selected from hydroxy and carboxy, wherein the amounts of stabilizing agent and cross-linking agent are sufficient to render a coating, such as an ink, comprising the composition more resistant to abrasion than the same coating without the metal cross-linking agent after storage at 40° C. for 5 days. Some such compositions can further include a pigment.

Compositions are still further provided which include a water-borne polymer; a metal cross-linking agent; and a stabilizing agent comprising from 2 to 10 carbon atoms and at least two functional groups independently selected from hydroxy and carboxy, wherein the viscosity of the composition is less than or equal to three times its initial value after storage of the composition at 40° C. for 30 days. Such compositions may also include a pigment.

In yet another aspect of the invention, there are provided methods of preparing a film or coating comprising applying a composition as described herein as a film or coating to a substrate. Substrates may include paper, wood, plastic, or textiles. In particular, overprint varnishes and inks of the invention may be applied to paper and films or sheets of polyethylene, polyvinyl chloride, polypropylene, polyester, polycarbonate, and polyimide, and paper treated with any of these materials.

Methods for coating the substrate with the overprint varnish or ink of the invention include well-known methods such as direct coating and printing. For directly coating the substrate with overprint varnish or ink, such methods as curtain, flow coating and roll coating can be used. Where the composition is low in viscosity, direct coating such as spray coating can also be employed. Printing processes used for coating include offset printing, gravure offset printing, and gravure and flexographic printing processes. The thickness of the coating film produced by these processes can be about 0.25 to about 25 micrometers, typically, about 1 to about 10 micrometers.

Thus, in one embodiment the water-borne polymer composition includes
  0.1 to 95 wt % water-borne polymer(s);
  3 to 99 wt % water;
  0.1 to 10 wt % metal cross linking agent(s);
  1.4 mole % or more stabilizing agent based on the amount of metal cross-linking agent, wherein the stabilizing agent comprises a diol or carboxylic acid; and
  up to 2 wt % surfactant;
  based on the total weight of the composition.
In other embodiments, the composition includes 2.4 mole % or more, 3 mole % or more, or 7 mole % or more stabilizing agent.

As will be understood by one skilled in the art, for any and all purposes, particularly in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub ranges as discussed above.

All patents and publications described herein are incorporated by reference in their entirety for all purposes.

EXAMPLES

The following non-limiting examples serve to further illustrate advantages of the disclosed invention.

Example 1

The support resin compositions given in Table 1 were prepared using a continuous polymerization process described in U.S. Pat. Nos. 4,546,160; 4,414,370; and 4,529,787.

TABLE 1

| Support Resins | | |
|---|---|---|
| | Support resin # | |
| | 14-3 | 14-4 |
| Acrylic Acid [%] | 34.4 | 33.6 |
| alpha-Methyl Styrene [%] | 31.5 | 35.6 |
| Styrene [%] | 34.1 | 25 |
| 2-Ethyl Hexylacrylate | | 5.8 |
| Total | 100.0 | 100.0 |
| Process Conditions | | |
| Reactor Temperature ° C. | 212 | 217 |
| Residence Time, min | 12 | 12 |
| Mol wt (GPC) | | |
| MW | 10000 | 9000 |
| MN | 3200 | 3000 |
| Acid Number | 215 | 220 |
| Oxygen Content | 14.8 | 15.1 |
| Tg, deg C. (Fox) | 123 | 117 |

Example 2

Emulsion polymers given in Table 2 were prepared from the support resins given in Table 1. A solution of support resin, ammonia (25%) and de-ionized (DI) water was brought to 85° C. in a 2 L 4 neck round bottom flask under a mild flow of nitrogen. A mixture of monomers was prepared and charged to the reactor. Next, ammonium persulfate (APS) dissolved in DI water was charged to the reactor. After 15 minutes, the remaining monomer mixture was supplied to the reactor in 45-60 minutes. During the process, temperature remained at 85° C. After this, the reactor content was remained under these conditions for 60 minutes to reduce residual monomer content. After this hold-period, the emulsion was cooled. The emulsion was mixed for an additional 15 minutes and subsequently filtered.

TABLE 2

| Emulsion Polymers from Support Resins | | | |
|---|---|---|---|
| | Emulsion Polymer # | | |
| | 15-4 | 15-5 | 15-6 |
| Resin 14-3 | | 113 | |
| Resin 14-4 | 190 | | 131 |
| Ammonia 25% | 50.1 | 28.4 | 39.7 |
| DI Water | 376.2 | 257.6 | 259.3 |
| Softanol 90* | 5 | | 12.9 |
| Methyl Methacrylate (MMA) | 56.7 | | 138 |
| Butyl Acrylate (BA) | 113.5 | | 30 |
| 2-Ethyl Hexylacrylate (2-EHA) | 56.7 | 239.5 | 167 |
| n-Butyl Methacrylate (n-BMA) | | 77.6 | |
| Ammonium Persulfate (APS) | 3.8 | 2.7 | 2.9 |

TABLE 2-continued

| Emulsion Polymers from Support Resins | | | |
|---|---|---|---|
| | Emulsion Polymer # | | |
| | 15-4 | 15-5 | 15-6 |
| DI Water | 140.3 | 256.2 | 211.9 |
| n-BMA | | 25 | |
| DI Water | 7.7 | | 7.3 |
| Total | 1000 | 1000 | 1000 |
| Properties of Emulsions | | | |
| Solids, % | 42.0 | 45.5 | 47.0 |
| pH | 7.7 | 7.8 | 8.1 |
| Viscosity, mPa · s | 550 | 450 | 600 |

*Softanol 90 is an alcohol ethoxylate (INEOS Oxide, UK).

Example 3

The wet resistance properties were measured for an ink based on a styrene/acrylic emulsion polymer and AZC with and without the addition of ammonium tartrate according to the invention. BACOTE 20 is a solution of AZC containing 20 wt % $ZrO_2$ and 2 wt % ammonium tartrate. The resulting styrene-acrylic based ink (see Table 3) was applied to a corona treated (500 W-20 m/min) white polyethylene 60 micron thick film using a 6 micron wire rod. The coated substrate was dried for 1 minute at 60° C. and subsequently stored overnight at room temperature.

Resistance and stability tests were carried out as follows. Dry adhesion tests were performed prior to wet adhesion. Prior to the wet rub, wet SATRA and wet crinkle testing, the coated substrate was soaked in deionized (DI) water for two hours. Adhesion tests were performed using SCOTCH 3M No. 610 tape. The rub test was done by rubbing the coated substrate with wet felt pads. The "Wet SATRA" was tested using a SATRA tester and the values reported as A/B, where A is the number of revolutions and B the percent of ink left on the substrate. The wet crinkle test was done by fiercely crinkling the coated substrate face to face under running water for 30 seconds. The scores for adhesion, rub and crinkle are rated 0 to 5, with 5 being best (no damage to the coated substrate) and 0 being worst (all ink removed). Viscosity was measured with a Brookfield viscometer using spindle 2 at 60 rpm. The results (Table 3B) show that the addition of ammonium tartrate did not adversely affect the performance of the ink in the adhesion tests, but significantly improved the stability of the ink (as measured by viscosity) on storage at elevated temperature (40° C.).

TABLE 3A

| Ink composition | Ink 1 (wt %) | Ink 2 (wt %) |
|---|---|---|
| Emulsion 15-5 | 65 | 65 |
| Pigment concentrate | 35 | 35 |
| 30 wt % JONCRYL 690 | | |
| 35 wt % Phthalocyanine Blue 15:3 | | |
| 1 wt % TEGO FOAMEX 850 | | |
| 34 wt % Water | | |
| Ammonium Tartrate | 0 | 0.15 |
| BACOTE 20 solution | 5 | 5 |

TABLE 3B

| Resistance Test | Ink 1 | Ink 2 |
|---|---|---|
| Dry adhesion | 5 | 5 |
| Wet adhesion | 5 | 5 |
| Wet rub | 5 | 5 |
| Wet SATRA | 200/85 | 200/75 |
| Wet crinkle | 5 | 5 |
| Initial Viscosity (Brookfield) (mPa/s) | 125 | 155 |
| Viscosity after 2 days at 40° C. (mPa/s) | Gel | 135 |

JONCRYL 690 is a high molecular weight, high acid value solid grade polymer. Both are available from Johnson Polymer LLC, Sturtevant, Wis. TEGO FOAMEX 805 is an antifoam agent available from Tego Chemie.

Example 4

The resistance properties of inventive ink compositions were tested after storage of the ink before use for different lengths of time and temperatures. Tables 4A and 4B show the effects of varying amounts of AZC (added in the form of BACOTE 20) in the presence and absence of ammonium tartrate (AT) on an ink comprising a 70:30 mixture of Emulsion 15-5 and 15-4 (Table 2). Table 4A shows the results obtained with substrate that was coated with freshly made ink while Table 4B shows the results obtained with substrate that was coated with ink stored for 2 days at 40° C. before use. The results show that the addition of ammonium tartrate had little or no effect on the resistance properties of the inks.

TABLE 4A

| Resistance Tests in the | % BACOTE 20 Present in Ink | | | | | |
|---|---|---|---|---|---|---|
| Absence of Tartrate | 0 | 2 | 4 | 6 | 8 | 10 |
| Dry adhesion | 5 | 5 | 5 | 5 | 5 | 5 |
| Wet adhesion | 3 | 5 | 3 | 5 | 5 | 5 |
| Wet rub | 5 | 5 | 5 | 5 | 5 | 5 |
| Wet SATRA | 50/0 | 200/10 | 50/0 | 150/0 | 150/0 | 150/0 |
| Wet crinkle | 2 | 2.5 | 1 | 3.5 | 4 | 4.5 |

TABLE 4B

| Resistance Tests in the | % BACOTE 20 Present in Ink | | | | | |
|---|---|---|---|---|---|---|
| presence of 0.15 wt % AT | 0 | 2 | 4 | 6 | 8 | 10 |
| Dry adhesion | 5 | 5 | 5 | 5 | 5 | 5 |
| Wet adhesion | 2 | 5 | 2 | 5 | 5 | 5 |
| Wet rub | 3 | 5 | 1 | 5 | 5 | 5 |
| Wet SATRA | 20/0 | 100/40 | 30/0 | 80/0 | 60/0 | 30/0 |
| Wet crinkle | 2 | 4.5 | 1 | 3 | 1 | 1 |

Ink comprising Emulsion 15-5 and 5% BACOTE 20 was tested as in Example 3 after 5 days storage at room temperature (Table 4C) and after 5 days storage at 40° C. (Table 4D). Inks comprising other water-borne polymers are also shown in Table 4D. Further tests on inks that were stored for five days at room temperature and one day at 40° C. or for 1 month at 40° C. are presented in Table 4E. Results obtained with and without 0.15 wt % AT show that inventive compositions including AZC and ammonium tartrate can be formulated to display excellent resistance properties, even after challenging storage conditions.

TABLE 4C

| | Storage for 5 Days at 40° C. | |
|---|---|---|
| Resistance Tests | No AT | AT added |
| Dry adhesion | 5 | 5 |
| Wet adhesion | 5 | 5 |
| Wet rub | 5 | 5 |
| Wet SATRA | 200/95 | 200/90 |
| Wet crinkle | 4.5/5 | 4.5/5 |

TABLE 4D

| Resistance | Storage for 5 Days at 40° C. | | | |
|---|---|---|---|---|
| Tests | Ink A[1] | Ink B[2] | Ink C[3] | Ink D[4] |
| Dry adhesion | 5 | 4.5 | 5 | 5 |
| Wet adhesion | 4.5 | 1 | 3 | 5 |
| Wet rub | 5 | 1 | 3 | 5 |
| Wet SATRA | 25/0 | 25/0 | 50/0 | 200/85 |
| Wet crinkle | 1 | 1 | 1 | 4.5/5 |

[1]Emulsion 15-5, no AT.
[2]Emulsion 15-4, AT.
[3]Emulsion 15-6, AT.
[4]Emulsion 15-5, AT, JONWAX W35 (wax emulsion; Johnson Polymer LLC).

TABLE 4E

| Resistance | Storage for 5 days at RT and 1 day at 40° C. | | | | 1 month 40° C. | 10 months RT |
|---|---|---|---|---|---|---|
| Test | Ink A[1] | Ink B[2] | Ink C[3] | Ink D[4] | Ink E[5] | Ink D[4] |
| Dry adhesion | 5 | 5 | 5 | 5 | 5 | 5 |
| Wet adhesion | 3 | 5 | 5 | 5 | 5 | 5 |
| Wet rub | 5 | 5 | 5 | 5 | 5 | 5 |
| Wet SATRA | 200/80 | 200/20 | 200/70 | 200/95 | 200/85 | 200/95 |
| Wet crinkle | 4.5/5 | 4.5/5 | 4.5 | 4.5/5 | 4.5/5 | 4.5/5 |

[1]Emulsion 15-5:15-4 (70:30), AT.
[2]Emulsion 15-5:15-6 (70:70), AT.
[3]Emulsion 15-5, no AT.
[4]Emulsion 15-5, AT.
[5]Emulsion 15-5, AT, JONWAX W 35.

Example 5

In the present example, alkali soluble polymer compositions were prepared using JONCRYL HPD 96E (high molecular weight, high acid value solid grade polymer; Johnson Polymer LLC) at 80 wt % (acid number is 240). As shown in Table 5, the amount of BACOTE 20 (2.5, 57.5 and 10 wt %), the ratio of $ZrO_2$ to ammonium tartrate (AT) on molar basis and the level of ammonium carbonate (AC) were varied. The amount of added AT solution is based on the amount of BACOTE 20 and $ZrO_2$ to AT ratio. The amount of AT present in BACOTE 20 is 2%. All mixtures were brought to a total of 100 g and stored for 2 weeks at 40° C. The stability of the compositions was assessed based on the thickness of the sediment layer that was formed in the two weeks (more sediment indicates lower stability). Analysis of the these results show that the variation in sediment layer level can be accounted for by the variation in Zr:AT level, and the overall Zr level. Thus, addition of AT to AZC containing polymer solutions clearly improves stability of the solutions over that exhibited without added AT. In addition, the results clearly show the superiority of AT alone (entries 5-8) versus AC alone (entries 21-28) in this system. Finally, the results show that a cumulative effect is achieved when both AT and AC are present together.

TABLE 5

| No. | ZRO$_2$:AT | AC (20%) | BACOTE | DW | AT (5%) | Sediment Layer (mm) |
|---|---|---|---|---|---|---|
| 1 | 25 | 0.00 | 2.5 | 16.90 | 0.60 | 6 |
| 2 | 20 | 0.00 | 2.5 | 16.75 | 0.75 | 6 |
| 3 | 15 | 0.00 | 2.5 | 16.50 | 1.00 | 4 |
| 4 | 10 | 0.00 | 2.5 | 16.00 | 1.50 | 2 |
| 5 | 25 | 0.00 | 5 | 13.80 | 1.20 | 6 |
| 6 | 20 | 0.00 | 5 | 13.50 | 1.50 | 4 |
| 7 | 15 | 0.00 | 5 | 13.00 | 2.00 | 2 |
| 8 | 10 | 0.00 | 5 | 12.01 | 2.99 | 1 |
| 9 | 25 | 0.00 | 7.5 | 10.70 | 1.80 | 5 |
| 10 | 20 | 0.00 | 7.5 | 10.26 | 2.24 | 2 |
| 11 | 15 | 0.00 | 7.5 | 9.51 | 2.99 | 1 |
| 12 | 10 | 0.00 | 7.5 | 8.01 | 4.49 | 0 |
| 13 | 25 | 0.00 | 10 | 7.61 | 2.39 | 2 |
| 14 | 20 | 0.00 | 10 | 7.01 | 2.99 | 4 |
| 15 | 15 | 0.00 | 10 | 6.01 | 3.99 | 2 |
| 16 | 10 | 0.00 | 10 | 4.01 | 5.99 | 0 |
| 17 | 25 | 0.98 | 5 | 12.83 | 1.20 | 4 |
| 18 | 25 | 1.30 | 5 | 12.50 | 1.20 | 2 |
| 19 | 25 | 1.95 | 5 | 11.85 | 1.20 | 0 |
| 20 | 25 | 3.90 | 5 | 9.90 | 1.20 | 0 |
| 21 | 0 | 0.98 | 5 | 14.02 | 0.00 | 9 |
| 22 | 0 | 1.30 | 5 | 13.70 | 0.00 | 9 |
| 23 | 0 | 1.95 | 5 | 13.05 | 0.00 | 8 |
| 24 | 0 | 3.90 | 5 | 11.10 | 0.00 | 3 |
| 25 | 0 | 0.98 | 5 | 14.02 | 0.00 | 9 |
| 26 | 0 | 1.30 | 5 | 13.70 | 0.00 | 7 |
| 27 | 0 | 1.95 | 5 | 13.05 | 0.00 | 9 |
| 28 | 0 | 3.90 | 5 | 11.10 | 0.00 | 3 |

Example 6

The resistance properties of an ink (Emulsion 15-5:15-4, 70/30) containing 5 wt. % BACOTE 20 and various levels of AT was tested over time. It was dried and tested as in Example 3. Results are shown in Table 6.

TABLE 6

| Amount of Added 15 wt. % AT Solution | Storage time at 40° C. | Dry adhesion | Wet adhesion | Wet rub | Wet SATRA | Wet crinkle |
|---|---|---|---|---|---|---|
| 0 wt. % | Initial | 5 | 5 | 5 | 200/80 | 5 |
|  | 7 days | 5 | 4 | 4 | 200/0 | 1 |
|  | 14 days | 5 | 2.5 | 2.5 | 15/0 | 1 |
| 0.20 wt. % | Initial | 5 | 5 | 5 | 200/80 | 5 |
|  | 7 days | 5 | 4.5 | 4.5 | 200/0 | 1 |
|  | 14 days | 5 | 2.5 | 2.5 | 15/0 | 1 |
| 0.33 wt. % | Initial | 5 | 5 | 5 | 200/70 | 5 |
|  | 7 days | 5 | 4 | 4.5 | 200/0 | 1 |
|  | 14 days | 5 | 2 | 2 | 15/0 | 1 |
| 0.40 wt. % | Initial | 5 | 5 | 5 | 200/70 | 5 |
|  | 7 days | 5 | 4 | 5 | 200/0 | 1 |
|  | 14 days | 5 | 2 | 2 | 15/0 | 1 |
| 0.60 wt. % | Initial | 5 | 5 | 5 | 200/70 | 5 |
|  | 7 days | 5 | 5 | 5 | 200/20 | 5 |
|  | 14 days | 5 | 4 | 4.5 | 200/0 | 3.5 |
|  | 21 days | 5 | 4.5 | 5 | 200/0 | 3.5 |
|  | 25 days | 5 | 4 | 4 | 15/0 | 1 |
| 0.80 wt. % | Initial | 5 | 5 | 5 | 200/60 | 5 |
|  | 7 days | 5 | 5 | 5 | 300/0 | 4.5 |
|  | 14 days | 5 | 5 | 5 | 200/0 | 4.5 |
|  | 21 days | 5 | 5 | 5 | 200/30 | 4.5 |
|  | 25 days | 5 | 5 | 5 | 200/30 | 4.5 |

Example 7

In this example, the resistance properties over time of the water-borne polymer composition and an ink formulated therefrom were tested. Drying conditions and tests were performed as described in Example 3. Results are shown in Table 7A. Viscosity over time was also tested as in Example 3 and results are shown in Table 7B.

| Formulation: | | | |
|---|---|---|---|
| Polymer (1) | | Ink (2) | |
| Emulsion 15-5 | 70.0 | Polymer (1) | 65.0 |
| Emulsion 15-4 | 30.0 | P.C. | 35.0 |
| Tartrate 30% solution | 0.46 | | |
| BACOTE 20 | 8.3 | | |

TABLE 7A

|  | Storage Conditions | Dry adhesion | Wet adhesion | Wet rub | Wet SATRA | Wet crinkle |
|---|---|---|---|---|---|---|
| Polymer (1) | 35 days at 40° C., ink made | 5 | 5 | 5 | 200/80 | 4.5 |
| Ink (2) | 35 days old | 5 | 5 | 5 | 200/0 | 1 |
| Polymer (1) | 42 days at 40° C., ink made | 5 | 5 | 5 | 200/80 | 4.5/5 |
| Ink (2) | 42 days old | 5 | 4.5 | 4.5 | 40/0 | 1 |
| Polymer (1) | 49 days at 40° C., ink made | 5 | 5 | 5 | 200/80 | 4.5/5 |
| Ink (2) | 49 days old | 5 | 3 | 3 | 10/0 | 1 |
| Polymer (1) | 56 days at 40° C., ink made | 5 | 4.5/5 | 4.5/5 | 100/0 | 1 |
| Ink (2) | 56 days old | 5 | 1 | 1 | 10/0 | 1 |

TABLE 7B

| | Brookfield Viscosity mPa · s after storage of . . . day(s) at 40° C. | | | | | | | | | |
|---|---|---|---|---|---|---|---|---|---|---|
| Sample | Initial (01.08.03) | 1 | 7 | 14 | 21 | 28 | 35 | 42 | 49 | 56 |
| Polymer (1) | 560 | 300 | 320 | 360 | 720 | 1280 | 1240 | 1320 | 1420 | 1560 |
| Ink (2) | 450 | 200 | 180 | 240 | 1120 | 1050 | 1080 | 1260 | 1320 | 1380 |

Example 8

The resistance properties and viscosity of the ink of Example 7 were tested after storage at various temperatures and lengths of time. Tests were performed as in Example 3. Results are shown in Table 8.

TABLE 8

| Storage Time | temp | Dry adhesion | Wet adhesion | Wet rub | Wet SATRA | Wet crinkle | Viscosity |
|---|---|---|---|---|---|---|---|
| 1 Day | 20° C. | 5 | 5 | 5 | 200/55 | 3 | 340 |
|  | 25° C. | 5 | 5 | 4.5/5 | 200/5 | 2.5 | 320 |
|  | 30° C. | 5 | 5 | 4.5/5 | 200/60 | 1.5/1 | 340 |
|  | 35° C. | 5 | 5 | 4.5/5 | 200/40 | 4.5 | 360 |
|  | 40° C. | 5 | 5 | 4.5/5 | 200/85 | 2.5/2 | 380 |
|  | 50° C. | 4.5/5 | 5 | 4.5/5 | 200/75 | 4.5/5 | 500 |
|  | 60° | 5 | 4.5 | 4.5 | 100/0 | 1 | 900 |
| 4 Days | 20° C. | 5 | 5 | 4.5/5 | 130/0 | 4 | 340 |
|  | 25° C. | 5 | 5 | 4.5/5 | 200/40 | 2.5 | 360 |
|  | 30° C. | 5 | 4.5/5 | 5 | 200/5 | 3.5 | 400 |
|  | 35° C. | 5 | 4.5/5 | 5 | 200/15 | 2 | 500 |
|  | 40° C. | 5 | 4.5/5 | 5 | 200/45 | 1.5 | 440 |
|  | 50° C. | 5 | 4 | 4.5/5 | 15/0 | 1 | 980 |
|  | 60° | 5 | 1.5 | 1.5 | 50/0 | 1 | 3360 |
| 14 Days | 20° C. | 5 | 5 | 5 | 200/75 | 4.5/5 | 340 |
|  | 25° C. | 5 | 5 | 5 | 200/40 | 4 | 320 |
|  | 30° C. | 5 | 4.5/5 | 4.5 | 200/15 | 2 | 440 |
|  | 35° C. | 5 | 4.5/5 | 4.5/5 | 140/0 | 1.5 | 530 |
|  | 40° C. | 5 | 4 | 4.5/5 | 25/0 | 1 | 520 |
|  | 50° C. | 5 | 2.5 | 4.5 | 20/0 | 1 | 1200 |
|  | 60° |  | 1.5 | 1 | 5/0 | 1 | 3400 |

Example 9

The resistance properties of the ink of Example 7 was tested at various ratios of AT to Zr (from added AZC). Tests were performed as in Example 3. Results are shown in Table 9.

TABLE 9

|  | Mole Ratio AT to Zr | | | | | |
|---|---|---|---|---|---|---|
| Resistance Tests | 0:1 | 1:14 | 1:12 | 1:10 | 1:8 | 1:6 |
| Wet adhesion | 5 | 5 | 5 | 5 | 4 | 2 |
| Wet rub | 5 | 5 | 5 | 5 | 4 | 2 |
| Wet SATRA | 200/80 | 200/70 | 200/60 | 200/10 | 80/0 | 20/0 |
| Wet crinkle | 5 | 4 | 4 | 3 | 1 | 1 |

While various embodiments have been illustrated and described, it should be understood that changes and modifications can be made therein in accordance with one of ordinary skill in the art without departing from the invention in its broader aspects. Various features of the invention are defined in the following claims.

What is claimed is:

1. A coating comprising
a composition comprising:
   a water-borne polymer comprising one or more COOH groups;
   a metal cross-linking agent; and
   a stabilizing agent comprising from 2 to 10 carbon atoms and at least two functional groups independently selected from hydroxy and carboxy, wherein the amount of stabilizing agent is 1.4 mole percent or more of the amount of cross-linking agent;
wherein:
   the composition is stable for at least a month at 40° C. and up to six months at room temperature;
   the stabilizing agent is selected from tartaric acid, gluconic acid, mucic acid, saccharic acid, oxalic acid, glycolic acid, lactic acid, malic acid, citric acid, mandelic acid, malonic acid, maleic acid, succinic acid, glutaric acid, mannitol, fructose, glucose, a salt thereof, or a mixture of two or more thereof; and
   the coating is a paint, an ink, an overprint varnish, or a heat seal lacquer.

2. The coating of claim 1, wherein the water-borne polymer is an emulsion polymer or a water-soluble resin.

3. The coating of claim 1, wherein the water-borne polymer comprises an acrylic, acrylic/vinyl, polyester polymer, or a blend thereof.

4. The coating of claim 1, wherein the water-borne polymer comprises polymerized monomers selected from one or more of acrylic acid, methacrylic acid, itaconic acid, maleic acid, fumaric acid, crotonic acid, acrylic anhydride, methacrylic anhydride, itaconic anhydride, maleic anhydride, fumaric anhydride, crotonic anhydride, ethyl methacrylate, methyl methacrylate, butyl acrylate, butyl methacrylate, 2-ethylhexyl acrylate, ethyl acrylate, vinyl acetate, methyl acrylate, 2-hydroxyethyl methacrylate, 2-hydroxyethyl acrylate, glycidyl acrylate, glycidyl methacrylate, acetoacetoxyethyl methacrylate, acetoacetoxyethyl acrylate, allyl acetoacetate, vinyl acetoacetate, acrolein, diacetone acrylate, acetonyl acrylate, 2-hydroxypropyl acrylate acetylacetate, butanediol-1,4-acrylate acetylacetate, or a blend thereof.

5. The coating of claim 1, wherein the water-borne polymer comprises an acrylic/styrene polymer.

6. The coating of claim 1, wherein the water-borne polymer has an acid number of 20 to 400.

7. The coating of claim 1, wherein the metal cross-linking agent comprises Zr, Ti, Hf, Cr, Zn, Al, or a mixture of any two or more thereof.

8. The coating of claim 7, wherein the metal cross-linking agent comprises Zr.

9. The coating of claim 7, wherein the metal cross-linking agent is a salt or complex of ammonia, acetate, propionate, sulfate, carbonate, nitrate, phosphate, tartrate, acetylacetonate, or a mixture of any two or more thereof.

10. The coating of claim 1, wherein the metal cross-linking agent is ammonium zirconium carbonate.

11. The coating of claim 8, wherein the water-borne polymer has a molar ratio of carboxylate to Zr of from about 10:1 to about 1:2.

12. The coating of claim 11, wherein the molar ratio of carboxylate to Zr is about 4:1 to about 1:1.

13. The coating of claim 1, wherein the molar percentage of stabilizing agent to metal cross-linking agent is 2.4 mole percent or more.

14. The coating of claim 1, wherein the molar percentage of stabilizing agent to metal cross-linking agent is 3 mole percent or more.

15. The coating of claim 1, wherein the molar percentage of stabilizing agent to metal cross-linking agent is 7 mole percent or more.

16. The coating of claim 1, wherein the molar percentage of the stabilizing agent to metal cross-linking agent is 7 mole percent to about 50 mole percent.

17. The coating of claim 1, further comprising one or more additives selected from surfactants, solvents, leveling agents, rheology agents, waxes, buffering agents, dispersing agents, defoaming agents, antifoaming agents, modifying polymers, rewetting agents, biocides, or resolubility agents.

18. The coating of claim 1, further comprising a buffering agent.

19. The coating of claim 1, further comprising a non-ionic surfactant.

20. The coating of claim 1, wherein the water-borne polymer comprising COOH groups further comprises a polystyrene, polyvinylalcohol, polyurethane, polyamide, polyethylene glycol, styrene-butadiene-rubber polymer, nitrocellulose, or a blend thereof.

21. The coating of claim 1, wherein the water-borne polymer comprising COOH groups further comprises polymerized monomers selected from one or more of styrene, methyl styrene, alpha-methyl styrene, ethyl styrene, isopropyl styrene, tertiary-butyl styrene, acyclic conjugated dienes, vinyl alcohol vinyl chloride, formyl styrol, vinyl methyl ketone, vinyl ethyl ketone, vinyl butyl ketone, or a blend thereof.

22. The coating of claim 1 further comprising a pigment.

* * * * *